(12) United States Patent
Yamaguchi

(10) Patent No.: US 6,196,403 B1
(45) Date of Patent: Mar. 6, 2001

(54) BOTTLE HAVING A HANGING TOOL

(75) Inventor: Hisao Yamaguchi, Nagano-ken (JP)

(73) Assignee: A. K. Technical Laboratory, Inc., Nagano-Ken (JP)

( * ) Notice: Subject to any disclaimer, the term of this patent is extended or adjusted under 35 U.S.C. 154(b) by 0 days.

(21) Appl. No.: 09/050,836

(22) Filed: Mar. 30, 1998

(30) Foreign Application Priority Data

Mar. 31, 1997 (JP) .................................................. 9-081063

(51) Int. Cl.⁷ .................................................. B65D 23/10
(52) U.S. Cl. .......................... 215/396; 215/399; 220/759
(58) Field of Search .................................. 215/396, 398, 215/399; 220/753, 759

(56) References Cited

U.S. PATENT DOCUMENTS

| | | | |
|---|---|---|---|
| 4,231,605 | * | 11/1980 | Newman ............................. 294/87.2 |
| 4,395,378 | * | 7/1983 | Alberghini et al. ............. 215/399 X |
| 4,509,639 | * | 4/1985 | Thompson ....................... 294/87.2 X |
| 4,516,687 | * | 5/1985 | Tagichi et al. .................... 215/396 X |
| 4,747,519 | * | 5/1988 | Green et al. ...................... 215/399 X |
| 4,852,762 | * | 8/1989 | Chou-Sheng ...................... 215/396 X |
| 5,202,094 | * | 4/1993 | Jones et al. ....................... 215/396 X |
| 5,413,261 | * | 5/1995 | Wu .................................... 215/396 X |
| 5,749,497 | * | 5/1998 | Davis ................................ 215/399 X |
| 5,862,929 | * | 1/1999 | Takeuchi et al. ................. 215/396 X |

FOREIGN PATENT DOCUMENTS

| | | | |
|---|---|---|---|
| 0 732 187 A1 | * | 9/1996 | (EP) . |
| 0 775 639 A1 | * | 5/1997 | (EP) . |
| 03 268 907 | * | 11/1991 | (JP) . |

* cited by examiner

*Primary Examiner*—Sue A. Weaver
(74) *Attorney, Agent, or Firm*—Weingarten, Schurgin, Gagnebin & Hayes LLP

(57) ABSTRACT

A bottle with a hanging tool detachably provided. The hanging tool comprises a flat and long connection portion extending sideways from the neck portion and having a length shorter than an outer diameter of the bottom of the bottle, and a separately molded wide annular handle portion. The connection portion is provided at its intermediate portion with a narrow portion crossing the connection portion transversely to reduce a thickness thereof, thereby making the connection portion vertically bendable at the narrow portion, a free end of the connection portion and the handle portion are formed at their predetermined locations with joint portions comprising a pair of engagement means, and the handle portion is detachable attached to the connection portion. Thereby an injection mold for molding a preform can be simple in structure and is suppressed from being enlarged.

1 Claim, 3 Drawing Sheets

PRIOR ART

BOTTLE HAVING A HANGING TOOL

BACKGROUND OF THE INVENTION

1. Field of the Invention

The present invention relates to a stretch blow molded bottle having a hanging tool provided on the neck portion thereof.

2. Background Art

It is known to injection mold a preform having a handle which is integrally formed and extended longitudinally and downwardly from a side surface positioned below a threaded portion of a neck of the preform and to stretch blow mold the preform into a bottle which has a thin body wall from a distal end of the neck to a bottom so as to obtain a bottle integrally having a handle.

This longitudinally long handle is thick so as to secure a certain strength. If a resin used as a material for molding the bottle is polyethylene terephthalate, although it has a certain hardness as no further process is provided after the injection molding, it lacks an impact strength. This might cause a damage of the handle portion when the bottle filled with contents accidentally fell down on the ground from a shelf and the like.

Therefore, as shown in FIG. 4, there has been provided a bottle which is integrally provided at its portion lower than its neck portion 2 of a bottle body 1 with a flat bendable hanging tool 3 which is long in its transverse direction.

The hanging tool 3 of the bottle 1 constructed in the above described manner is bendable at a narrow portion 30 of the hanging tool 3, and one can carry the bottle by hanging his or her finger into an annular finger engaging tab 3a. Further, since the hanging tool 3 is formed flat and thin, it requires less amount of resin material than a conventional handle, and even if the hanging tool is bent at the narrow portion, the hanging tool can restore. Therefore, it is unnecessary to secure a space for the hanging tool 3 when the bottle is packed in a box.

However, in the above described bottle having the bendable hanging tool also, the hanging tool 3 is integrally formed at the time of injection molding of the preform 10 as shown in FIG. 5, and it is required to widen the width of the finger hanging portion so that one can easily hold the bottle. Therefore, there is a problem that the injection mold for molding the preform 10 with the bendable hanging tool 3 becomes large.

That is, in the injection mold, a flat cavity for the hanging tool is formed between parting surfaces of a mold A for use in molding the neck portion and a mold B for use in molding the body and the bottom, molten resin is injected and charged from the neck portion, thereby injection molding the entire preform. However, in order to sufficiently widely mold the finger hanging portion of the hanging tool, it is necessarily required to design the injection mold such that the flat cavity for the hanging tool projects outward from the neck portion of the preform, and such a design complicates and enlarges the injection mold.

The present invention has been accomplished to solve the above described problems, and it is an object of the invention to provide a bottle having a hanging tool which can be produced efficiently while suppressing the injection mold for a preform from being enlarged, by separately molding a bendable flat connection portion which is integrally formed with a neck portion of the preform and a handle portion which is detachably attached to the connection portion and is separately molded, thereby forming the hanging tool to be provided on the neck portion of the bottle.

SUMMARY OF THE INVENTION

To achieve the above abject, according to the present invention, there is provided a bottle having a hanging tool, the hanging tool being formed on a side of the bottle lower than a threaded portion of a neck portion thereof at the time of injection molding of a preform, a portion of the bottle corresponding to a distal end of the neck portion lower than the hanging tool to a bottom being formed thin by stretch blow molding, wherein the hanging tool comprises a flat and long connection portion extending sideways from the neck portion and having a length shorter than an outer diameter of the bottom of the bottle, and a separately molded wide annular handle portion, the connection portion being provided at its intermediate portion with a narrow portion crossing the connection portion transversely to reduce a thickness thereof, thereby making the connection portion vertically bendable at the narrow portion, a free end of the connection portion and the handle portion being formed at their predetermined locations with joint portions comprising a pair of engagement means to attach the handle portion detachably to the connection portion.

The bottle is made of thermoplastic resin including, for example, polyester resin such as polyethylene terephthalate, polyethylene naphthalate, and polypropylene. In the case of a bottle made of polypropylene as molding resin, flexibility of the hanging tool is increased due to the property of polypropylene. In the case of a bottle made of polyethylene terephthalate, even if the connection portion in remained as it is injection molded, the free end thereof exhibits flexibility due to molecular orientation of the narrow portion. Therefore, bending strength and impact strength of the connection portion are increased so that the connection portion can hardly break even if it is thin.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Figure 1:
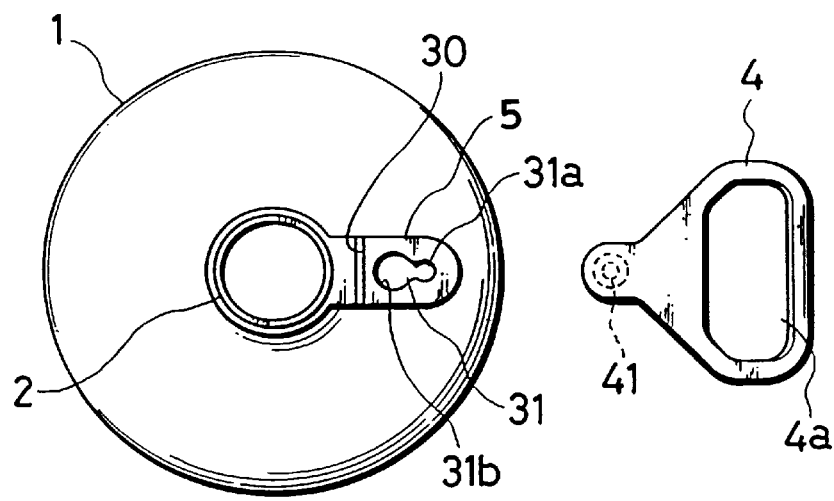
FIG. 1 is a plan view for explaining a bottle having a hanging tool according to the present invention.
Figure 2:
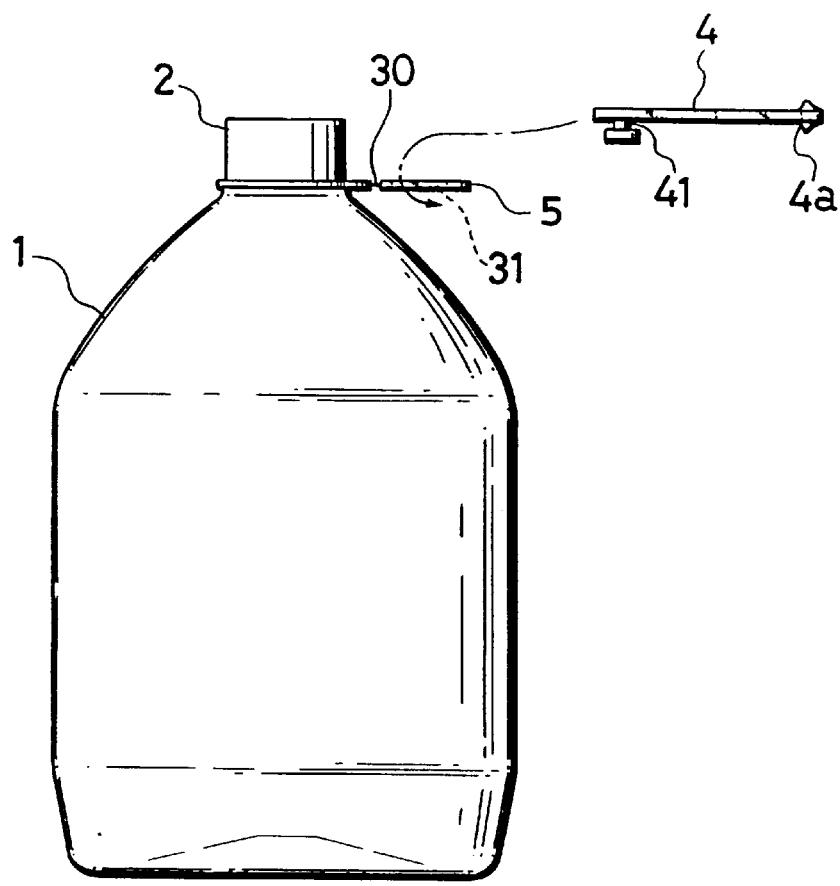
FIG. 2 is a side view of the bottle as in FIG. 1.
Figure 3:
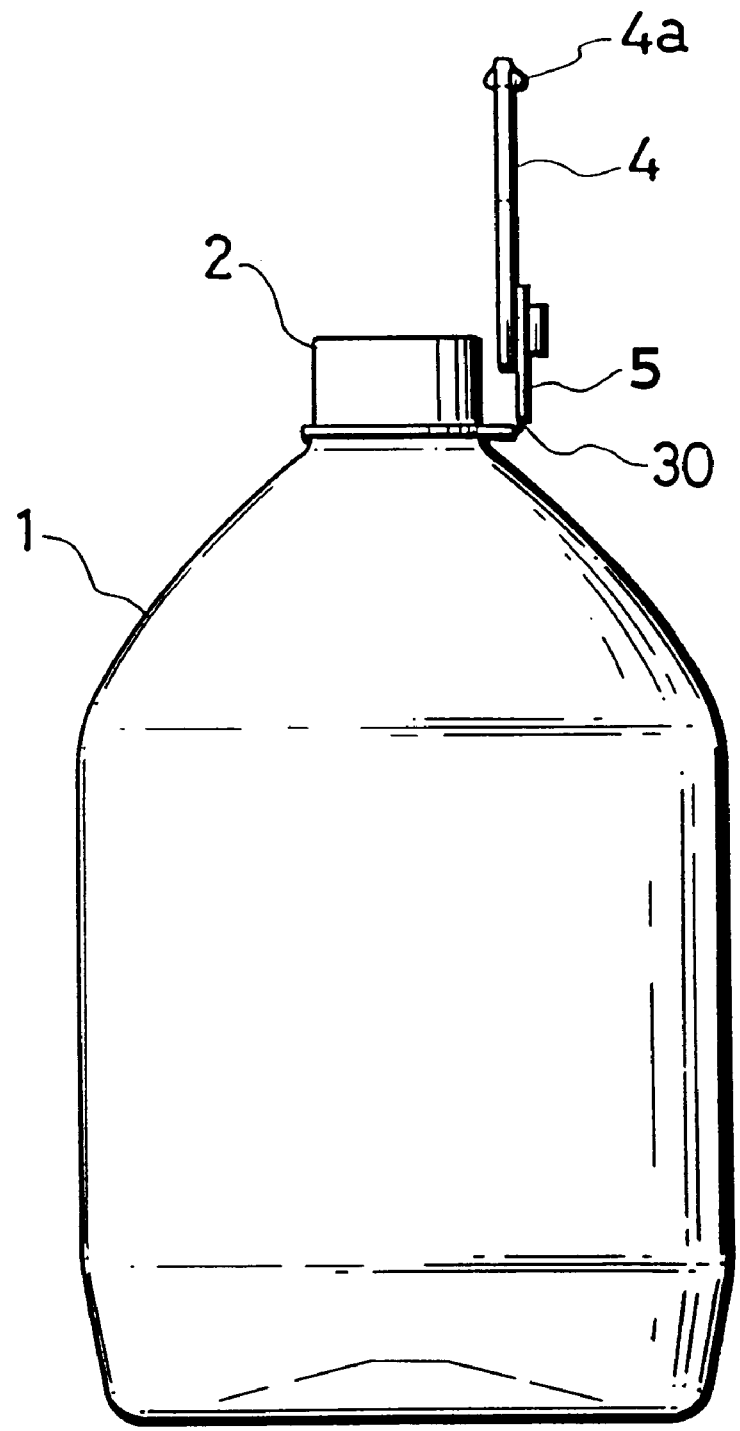
FIG. 3 is a side view showing a state where the bottle having the hanging tool is hung down.
Figure 4:
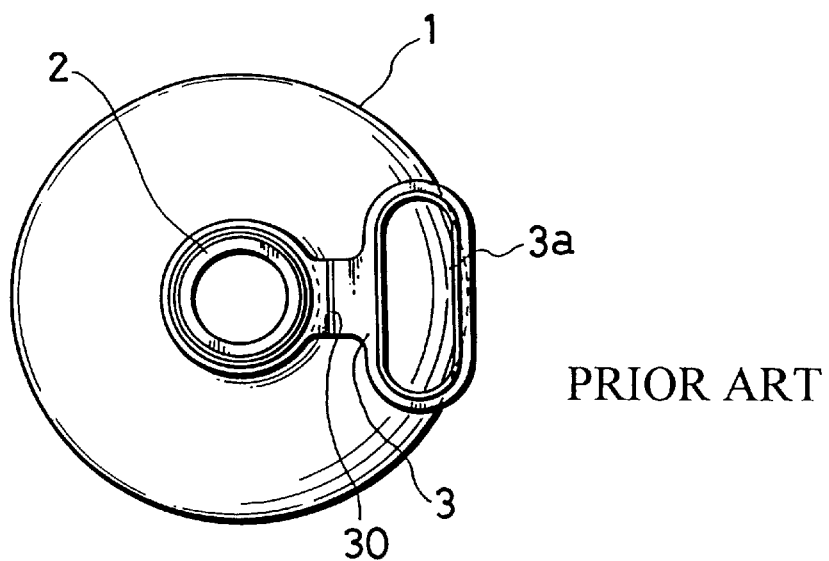
FIG. 4 is a plan view of a conventional bottle having a hanging tool.
Figure 5:
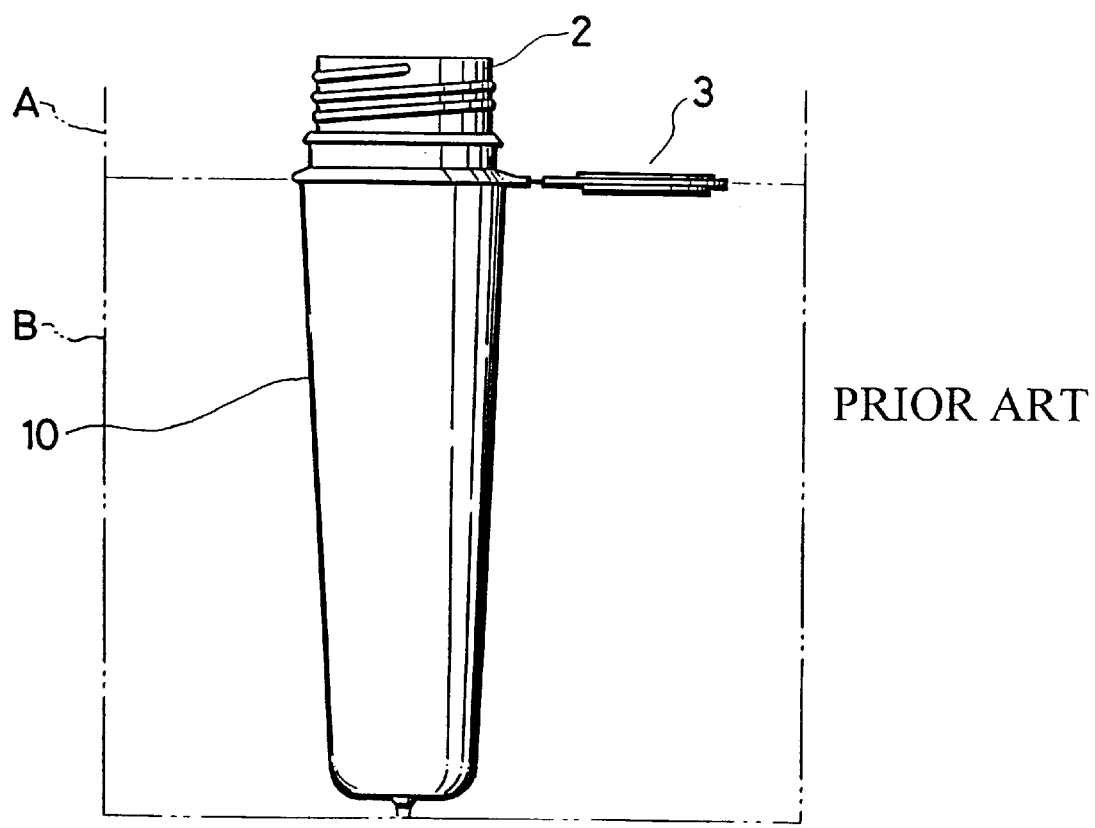
FIG. 5 is a side view of a preform of the conventional bottle having the hanging tool.

FIGS. 1 to 3 show an embodiment of the present invention. In FIG. 1, reference numeral 1 designates a bottle made of polyethylene terephthalate having an as-injection molded neck portion 2, and a portion of the bottle from a distal end of the neck portion 2 to a body portion and a bottom portion is made thin by stretch blow molding.

The neck portion 2 is formed with a thread or screw (not shown), and a support ring is formed at a portion of the neck portion 2 below the thread, for example. The support ring is integrally formed at its one side with a connection portion 5. A separately molded annular handle portion 4 is jointed to a free end of the connection portion 5, so as to form a bottle having a hanging tool.

The connection portion 5 is formed into a flat and long shape to project sideways such that a length thereof does not exceeds an outer diameter of the bottle. A thickness of the connection portion 5 is reduced at a narrow portion 30 formed in a widthwise direction so that the free end of the connection portion 5 is bendable vertically. The narrow portion 30 has a certain strength and flexibility due to molecular orientation of the resin generated at the time of the injection molding. The thickness of the narrow portion is preferably 0.7 mm or less, more preferably 0.5 mm or less, and most preferably 0.3 mm or less.

The handle portion 4 comprises an annular finger engaging tab 4a which is wider than the connection portion 5. The finger hanging portion 4a is formed with a finger tip insertion hole. The periphery of the finger tip insertion hole is reinforced by projection edges projecting up and down so as to lighten a load on inserted fingers.

A jointing portion is formed into one pair by the free end of the connection portion 5 and the handle portion such that the handle portion 4 can be attached to the connection portion 5 detachably. The jointing portion shown in the drawings includes a snowman-shaped or key hole shaped hole 31 formed in the free end of the connection portion 5, and a flanged engagement projection 41 formed at a predetermined portion of the handle portion 4. In this case, a diameter of a small diameter portion 31a of the snowman-shaped or key hole shaped hole 31 and a diameter of a shaft of the engagement projection 41 are formed substantially equal to each other.

Therefore, by inserting the engagement projection 41 into a large diameter portion 31b of the snowman-shaped key hole shaped hole 31 to slide the entire handle portion 4 toward the small diameter portion 31a, the connection portion 5 and the handle portion 4 are integrally attached.

More specifically, the engagement projection 41 is fitted into the small diameter portion 31a of the snowman-shaped key hole shaped hole 31, thereby sandwiching the connection portion 5 between the body of the handle portion 4 and the flange portion of the engagement projection 41, and therefore, the handle portion 4 should not drop off from the connection portion 5.

In the jointing portion, the connection portion and the handle portion require a pair of detachable engagement means, and such constructions are selected at the time of design.

Further, by forming such a jointing portion so that the handle portion is made detachable, it is possible to form the handle portion into arbitrary shape, and the width of the finger hanging portion or the entire shape of the handle portion can widely be varied.

Therefore, as shown in FIG. 3, one can carry the bottle 1 as constructed in the above described manner by hanging his or her finger into the finger hanging portion 4a of the handle portion 4, and can pour contents in the bottle by holding the handle portion 4 by one hand while supporting the bottom of the bottle with the other hand. Further, the entire hanging tool is flat and thin, it requires less amount of resin material than a conventional handle, and because the connection portion 5 is shorter than the outer diameter of the bottle, it is unnecessary to secure a space for the hanging tool when the bottle is packed in a box.

As described above, according to the present invention, it is unnecessary to provide a cavity for the handle portion with the injection mold of the preform so that the mold can be simple in structure, and is suppressed from being enlarged. Further, since the handle portion is separately molded, it is possible to widen the degree of freedom of the finger hanging portion which is required to be formed into a shape so that it can be easily held and therefore, there is provided a bottle which is easy to handle.

While the presently preferred embodiment of the present invention has been shown and described, it will be understood that the present invention is not limited thereto, and that various changes and modifications may be made by those skilled in the art without departing from the scope of the invention as set forth in the appended claims.

What is claimed is:

1. A bottle having a hanging tool, said hanging tool being formed on a side of said bottle lower than a threaded portion of a neck portion of said bottle at a time of injection molding of a preform, a portion of said bottle corresponding to a distal end of said neck portion lower than said hanging tool to a bottom being formed thin by stretch blow molding, characterized in that said hanging tool comprises a flat and long connection portion extending sideways from said neck portion and having a length shorter than an outer diameter of said bottom of the bottle, and a separately molded wide annular handle portion, said connection portion being provided at its intermediate portion with a narrow portion crossing said connection portion transversely to reduce a thickness thereof, thereby making said connection portion vertically bendable at said narrow portion, a free end of said connection portion and said handle portion being formed at their predetermined locations with joint portions comprising a pair of engagement means so as to attach said handle portion detachably to said connection portion.

* * * * *